(12) United States Patent
Burke et al.

(10) Patent No.: US 8,272,588 B2
(45) Date of Patent: Sep. 25, 2012

(54) ROTARY MANDOLIN WITH RETRACTABLE BLADE COVER

(75) Inventors: Julia Burke, Chicago, IL (US); Marianne Grisdale, Chicago, IL (US); Siarhei Murauyou, Chicago, IL (US)

(73) Assignee: WKI Holding Company, Inc., Rosemont, IL (US)

( * ) Notice: Subject to any disclaimer, the term of this patent is extended or adjusted under 35 U.S.C. 154(b) by 427 days.

(21) Appl. No.: 12/609,727

(22) Filed: Oct. 30, 2009

(65) Prior Publication Data

US 2011/0100179 A1    May 5, 2011

(51) Int. Cl.
*B02C 18/10* (2006.01)
(52) U.S. Cl. .......................... 241/92; 241/100; 241/298
(58) Field of Classification Search ............... 241/101.1, 241/101.01, 100, 94, 92, 296, 298; 83/167, 83/471.2, 478, 483
See application file for complete search history.

(56) References Cited

U.S. PATENT DOCUMENTS

| | | | |
|---|---|---|---|
| 1,834,717 A | 12/1931 | Knapp | |
| 3,698,460 A | 10/1972 | Ashton et al. | |
| 3,825,049 A | 7/1974 | Swett et al. | |
| 4,199,112 A * | 4/1980 | McLean | 241/92 |
| 4,212,431 A | 7/1980 | Doyel | |
| 4,369,680 A | 1/1983 | Williams | |
| 4,733,589 A | 3/1988 | Wolff | |
| 5,148,731 A | 9/1992 | Boerner | |
| 5,201,121 A | 4/1993 | Heiberg | |
| 5,745,999 A | 5/1998 | Zirkiev | |
| D399,711 S | 10/1998 | Cohen et al. | |
| 5,960,709 A | 10/1999 | Yip | |
| 6,302,014 B1 | 10/2001 | Kuan | |
| 6,854,675 B2 | 2/2005 | Wong | |
| 7,107,890 B2 | 9/2006 | Vincent | |
| 7,191,691 B2 | 3/2007 | Kaposi | |
| D574,186 S | 8/2008 | Kuan | |
| 2004/0231482 A1 | 11/2004 | Boilen | |
| 2008/0164357 A1 | 7/2008 | Chau et al. | |
| 2008/0257128 A1 | 10/2008 | Reimann et al. | |
| 2009/0183611 A1 | 7/2009 | Khubani | |

* cited by examiner

*Primary Examiner* — Mark Rosenbaum
(74) *Attorney, Agent, or Firm* — McDermott Will & Emery LLP (57) ABSTRACT

A rotary mandolin assembly for processing food comprises a container, a lid, and an operating handle. The container has a base and a sidewall that connects to and protrudes upwardly from the base. The sidewall terminates at a flange. The lid contacts the flange of the sidewall of the container. The lid has a cover, a retractable door, and a blade carrier. The cover has an opening formed therein. The retractable door is disposed above the opening of the cover. The retractable door is adapted to be positioned in one of a first position and a second position. The blade carrier has a plurality of blades attached thereto. The blade carrier is disposed beneath both the cover and the retractable door. The operating handle removably connects to the blade carrier.

20 Claims, 10 Drawing Sheets

FIG. 12

ROTARY MANDOLIN WITH RETRACTABLE BLADE COVER

TECHNICAL FIELD

The present invention relates to a mandolin for processing food, and more particularly, to a rotary mandolin with a removable handle and plurality of cutting blades as well as a retractable blade cover.

BACKGROUND OF THE INVENTION

When preparing certain foods, it is sometimes necessary to utilize a mandolin to slice a food item. For instance, when preparing a potato for use in various recipes, it is often necessary to cut the potato into slices. If slicing the potato with a knife, sometimes a user does not obtain uniform slices. In addition to obtaining uniform slices, preventing a user from easily being cut is also beneficial. Previous rotary mandolins may be awkward for some users, as the item to be cut is typically pushed away from a user at a downward angle, such that a user is pushing their hand in the direction of a blade on the mandolin. Further, in some instances it may be desired to provide a plurality of types of cut, such as a crinkled cut, also referred to as a waved cut, while also obtaining uniform slices, without having to disassemble a kitchen device to choose a blade. However, many past rotary mandolins required a user to replace a blade to provide a different type of cut, as they often only have a single blade mounted to the rotary mandolin.

Thus, it would be useful to provide a rotary mandolin having a plurality of selectable blades such that a user may select a particular type of cut without having to replace blades in the rotary mandolin. Further, it would be useful to provide a rotary mandolin with a retractable door that moves to an open position that allows the blades to contact food, and to a closed position that prevents the blades from being contacted. Therefore, a need exists for a rotary mandolin with a plurality of selectable blades and a retractable blade cover.

The present invention is provided to solve the problems discussed above and other problems, and to provide advantages and aspects not previously provided. A full discussion of the features and advantages of the present invention is deferred to the following detailed description, which proceeds with reference to the accompanying drawings.

SUMMARY OF THE INVENTION

According to one embodiment, a rotary mandolin assembly for processing food comprises a container, a lid, and an operating handle. The container has a base and a sidewall that connects to and protrudes upwardly from the base. The sidewall terminates at a flange. The lid contacts the flange of the sidewall of the container. The lid has a cover, a retractable door, and a blade carrier. The cover has an opening formed therein. The retractable door is disposed above the opening of the cover. The retractable door is adapted to be positioned in one of a first position and a second position. The blade carrier has a plurality of blades attached thereto. The blade carrier is disposed beneath both the cover and the retractable door. The operating handle removably connects to the blade carrier.

According to another embodiment, a lid for a rotary mandolin assembly for processing food comprises a cover, a retractable door, a rotatable blade carrier, and an operating handle. The cover has a threaded protrusion extending downward from the cover. The cover has an opening formed therein. The retractable door is disposed above the opening of the cover. The retractable door has a first position and a second position. The retractable door has an opening disposed around the threaded protrusion of the cover. The rotatable blade carrier is disposed below the cover. The rotatable blade carrier has a plurality of blades attached. The rotatable blade carrier being moveable to a processing position wherein at least one of the plurality of blades is positioned below the opening of the cover. The operating handle is removably attached to the blade carrier.

According to a further embodiment, a rotatable blade carrier for a rotary mandolin assembly for processing food comprises a plurality of cutting blades, a plurality of operating handle receiving portions, and a plurality of operating handle securing portions. The plurality of operating handle receiving portions are disposed at a periphery of the blade carrier. The plurality of operating handle securing portions are disposed at the periphery of the blade carrier. The plurality of operating handle securing portions are further disposed adjacent the operating handle receiving portions of the blade carrier. Wherein one of the plurality of operating handle receiving portions and one of the plurality of operating handle securing portions is associated with one of the plurality of cutting blades.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

The components in the drawings are not necessarily to scale, emphasis instead being placed upon clearly illustrating the principles of the present invention.

DETAILED DESCRIPTION

While this invention is susceptible to embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
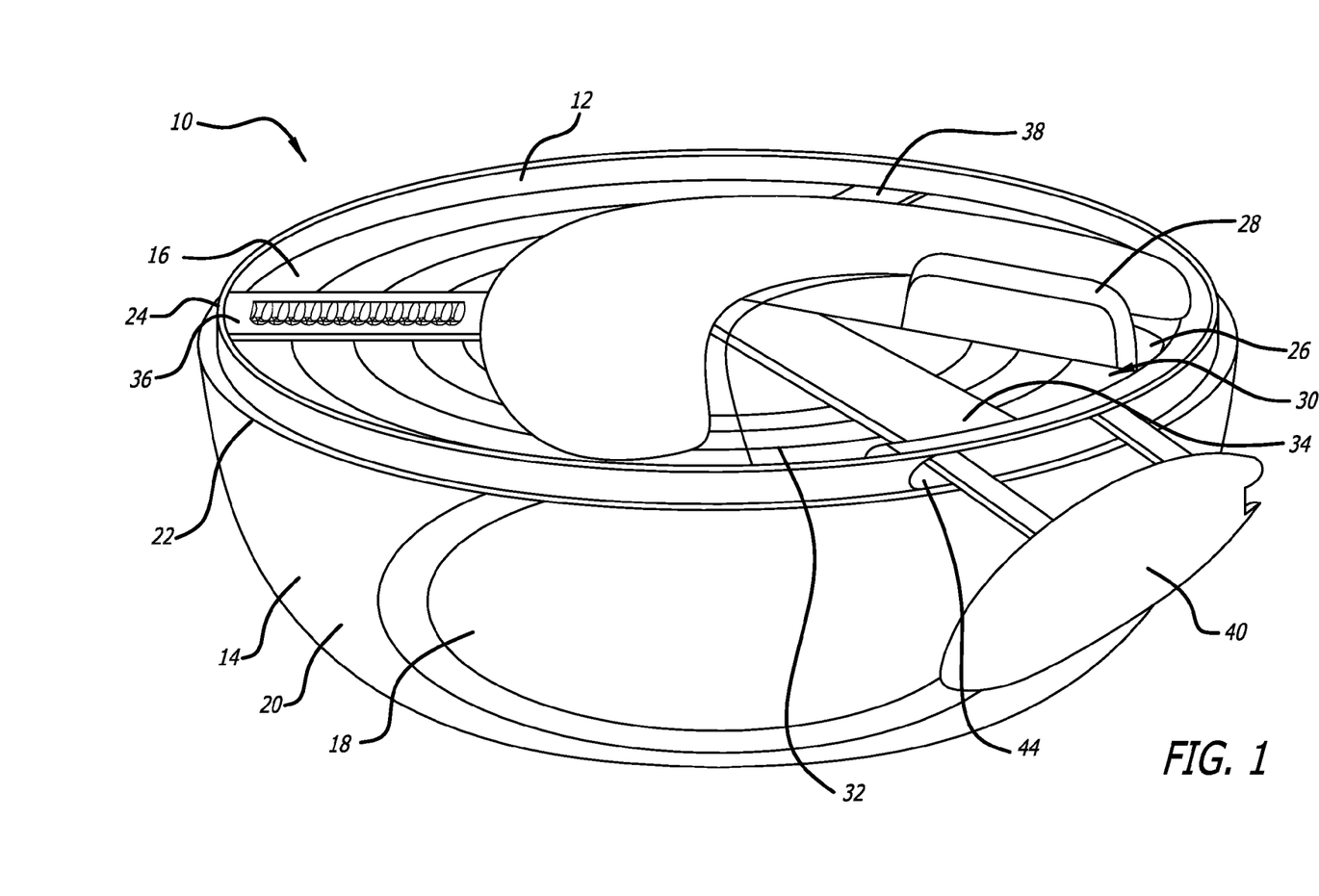
FIG. 1 is a perspective view of a rotary mandolin having a retractable blade cover in an open position according to one embodiment.

According to one embodiment of the present invention as shown in FIGS. 1-4, a rotary mandolin 10 for processing food is provided. The rotary mandolin 10 comprises a lid 12 and a container 14. As shown in FIG. 1, the container 14 is a bowl, however, it is contemplated that other container types may be utilized. The container 14 has a base 18 and a continuous sidewall 20 connected to the base 18 and protruding upward from the base 18. The sidewall 20 terminates at a flange 22 that forms a periphery of the container 14.

Figure 2:
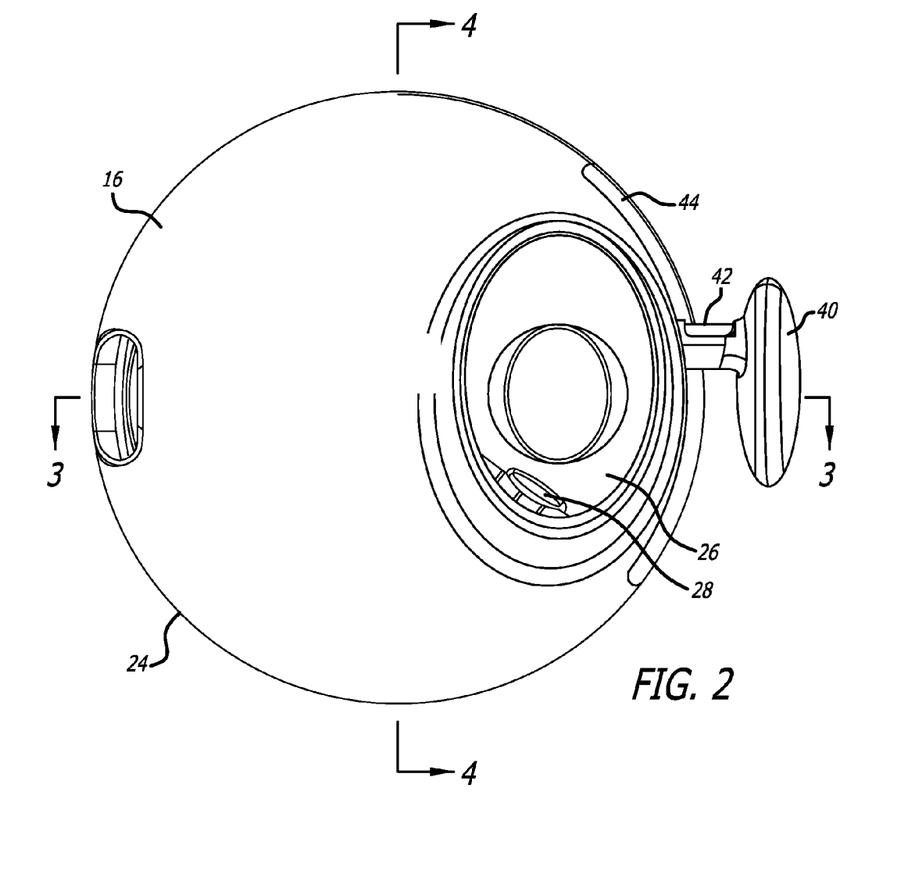
FIG. 2 is a top view of the rotary mandolin of FIG. 1.
Figure 3:
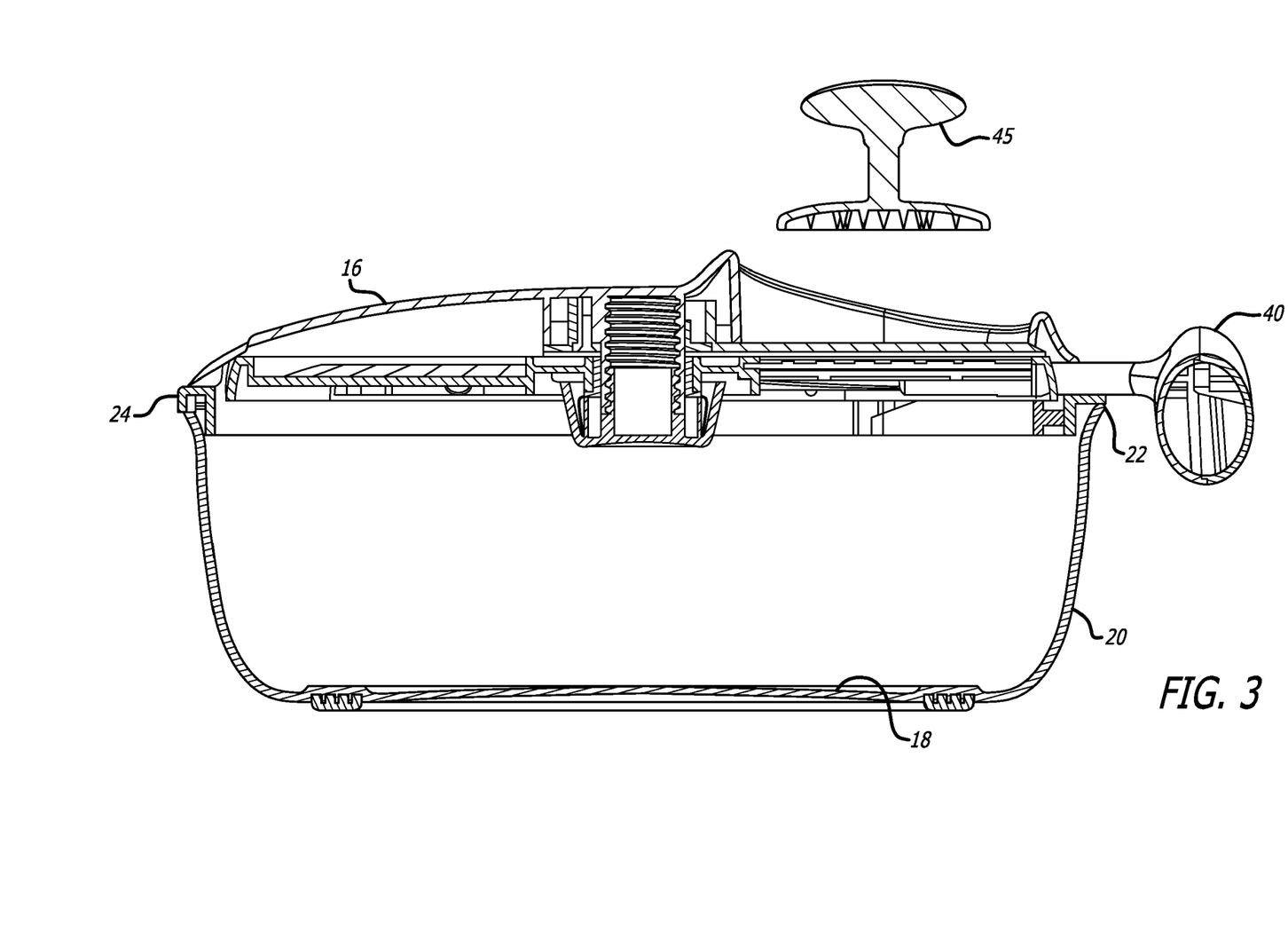
FIG. 3 is a front sectional view of the rotary mandolin of FIG. 1 taken along line 3-3 of FIG. 2.
Figure 4:
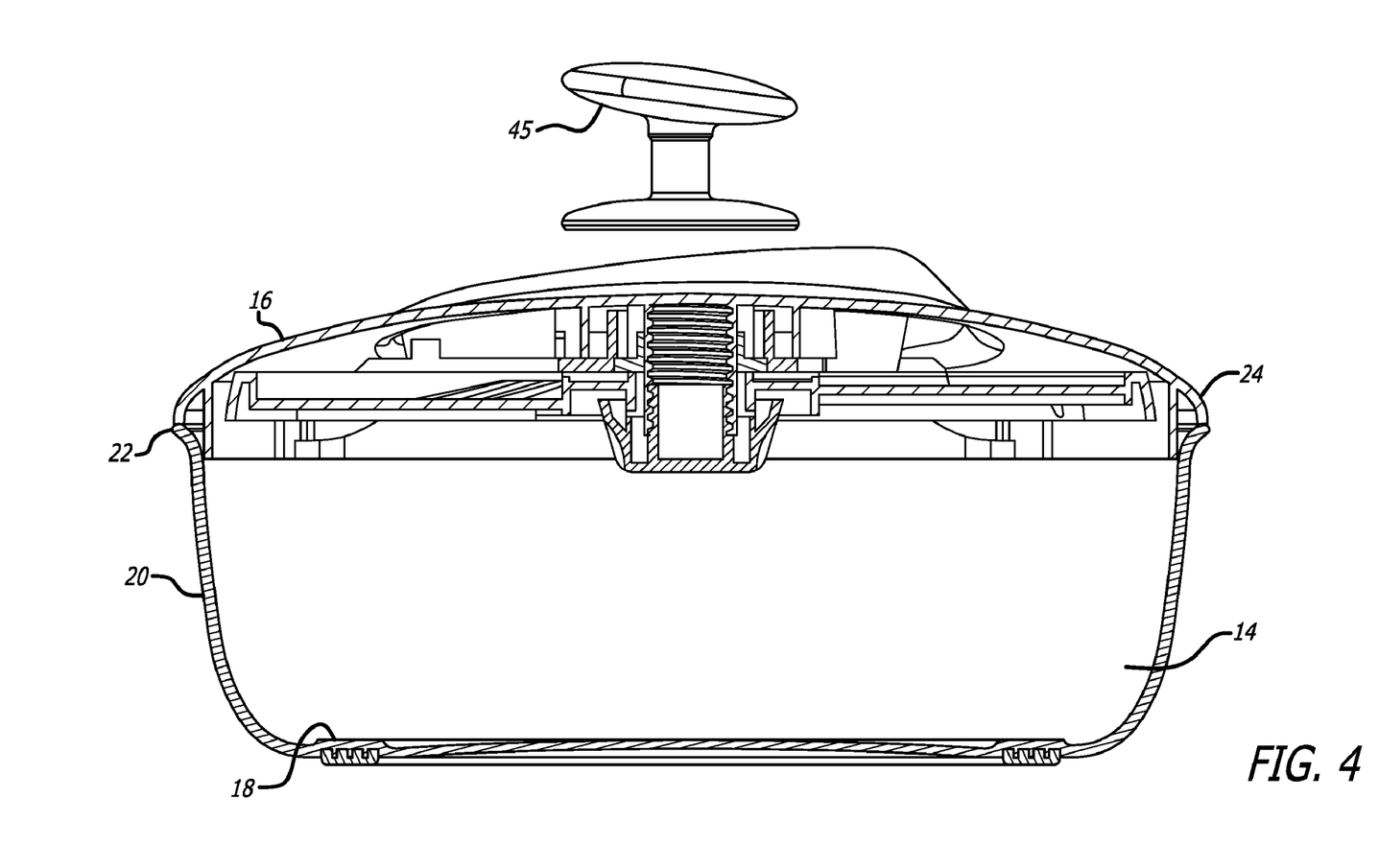
FIG. 4 is a side sectional view of the rotary mandolin of FIG. 1 taken along line 4-4 of FIG. 2.

The lid 12 removably attaches to the flange 22 of the container 14. The lid 12 comprises a cover 16 disposed over the base 18 of the container 14, to prevent materials from entering or exiting the container 14. The lid 12 has a periphery 24 that has a generally complimentary shape to the periphery 22 of the container 14. The lid 12 additionally comprises a retractable door 26. The retractable door 26 has a cover handle 28. The cover handle 28 allows a user to more easily position the retractable door 26 to a retracted position, as shown in FIG. 1, from a deployed position as shown in FIG. 2. The retractable door 26 is disposed over an opening 30 formed in the cover 16 of the lid 12 when positioned in the deployed position.

With the retractable door 26 in the retracted position, a rotatable blade carrier 32 may be accessed. The rotatable blade carrier 32 contains a plurality of blades used for cutting food with the rotary mandolin 10. As shown in FIG. 1, the rotatable blade carrier 32 has a first blade 34, a second blade 36, and a third blade 38. The first blade 34 is positioned for use in FIG. 1. It is contemplated that the first blade 34, second blade 36, and third blade 38 will provide different types of cutting surfaces, such as a thick cut, a crinkle cut, a thin cut, or other known blade varieties.

An operating handle 40 removably attaches to the rotatable blade carrier 32. The operating handle 40 rotates the rotatable blade carrier 32 about a central axis C (FIG. 4) such that one of the blades 34, 36, 38 may be utilized to cut food. The operating handle 40 has a release activator 42 that, when activated, allows the handle 40 to be removed from the rotatable blade carrier 32. Additional details of the operating handle 40 may be observed with respect to FIGS. 11 and 12. The handle 40 may be removed from the rotatable blade carrier 32 in order to select a different blade, such as the second blade 36, for use with the rotary mandolin 10, or the handle 40 may be removed for cleaning or storage purposes.

The operating handle 40 moves along a handle track 44 formed within the lid 12. The handle track 44 is disposed along a portion of the periphery 24 of the cover 16. The handle track 44 is disposed about a sufficient length of the periphery 24 to allow the operating handle 40 to allow the rotatable blade carrier 32 to move a sufficient distance to cut food. The handle track 44 additionally allows a portion of the rotatable blade carrier 32 to be exposed to the opening 30 such that a user may remove the operating handle 40 and rotate the rotatable blade carrier 32 a further amount to select a different blade. The operating handle 40 may then be reattached to the rotatable blade carrier 32 and the newly selected blade may be utilized.

The rotary mandolin 10 may additionally be provided with a food pusher 45. The food pusher 45 allows user to hold food in place while the rotary mandolin is being utilized. The food pusher 45 may be useful with certain foods that are difficult to grasp, might cause a stain, such as a beet, or may produce a strong odor, such as onions and garlic. The food pusher 45 may additionally reduce any chance of the user accidentally contacting one of the blades 34, 36, 38 while utilizing the rotary mandolin 10.

Figure 5:
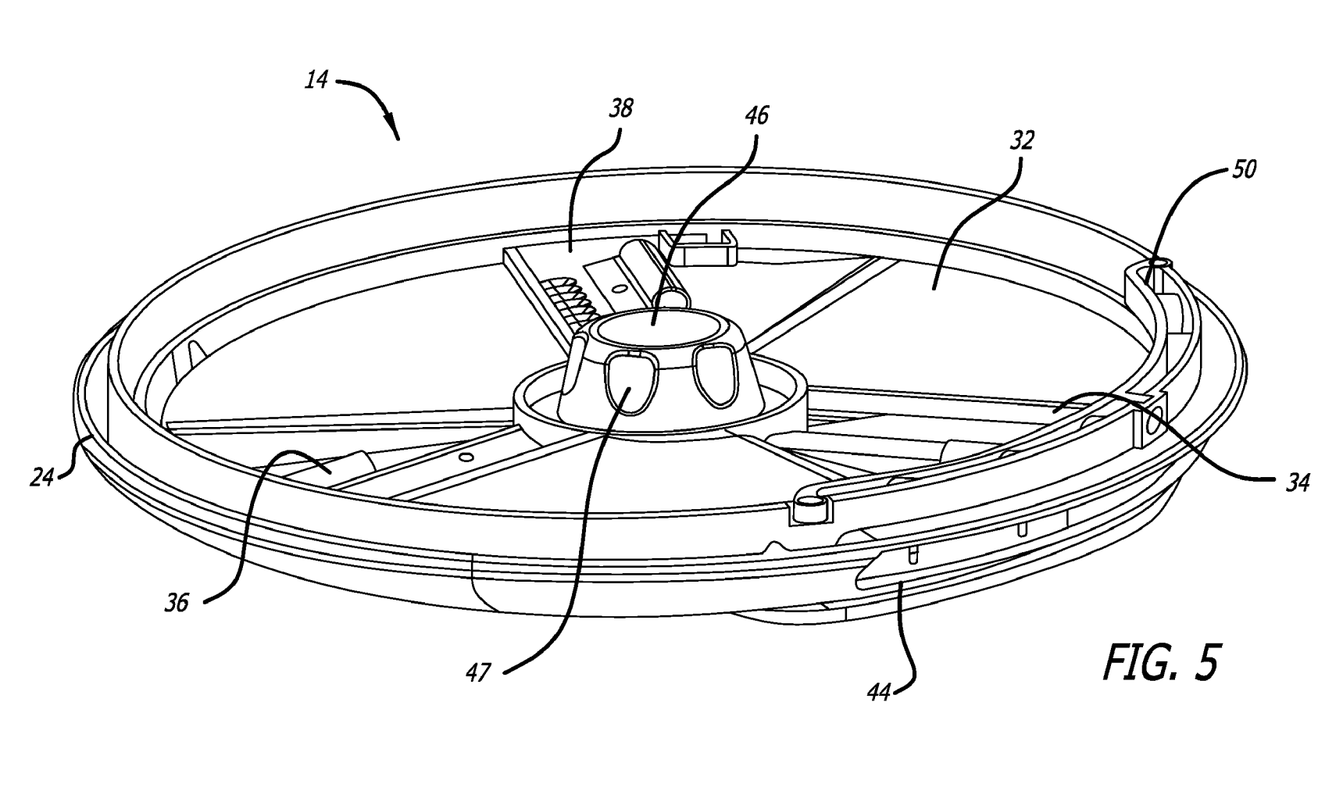
FIG. 5 is a perspective view of a lid of a rotary mandolin.
Figure 6:
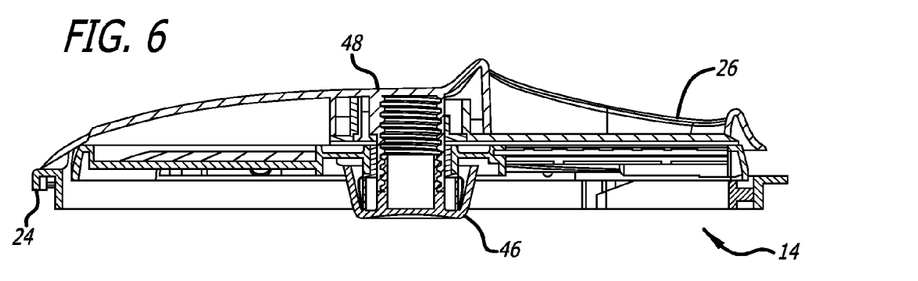
FIG. 6 is a front sectional view of the lid of FIG. 5.
Figure 7:
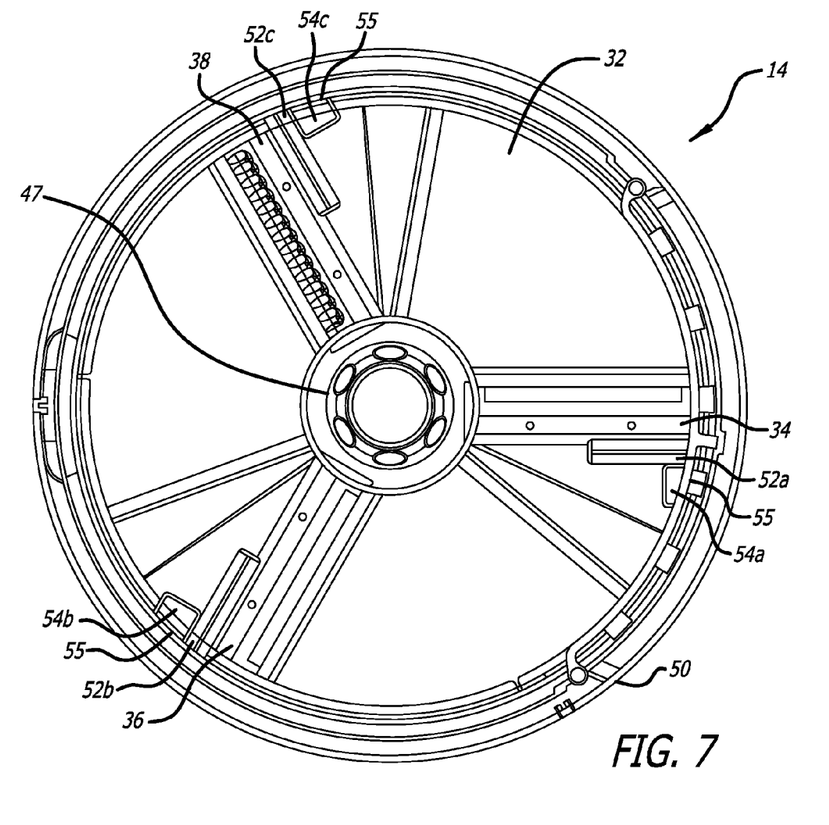
FIG. 7 is a bottom view of the lid of FIG. 5.

Turning now to FIGS. 5-7, the lid 12 is shown in additional detail. The lid 12 includes a securing nut 46 that holds the rotatable blade carrier 32 and the retractable door 26 to a threaded protrusion 48. The securing nut 46 and the threaded protrusion 48 cooperate to prevent the rotatable blade carrier 32 and the retractable door 26 from moving laterally along the axis C, but do allow the rotatable blade carrier 32 and the retractable door 26 to rotate about the axis C. The securing nut 46 may have a plurality of grip portions 47 to allow a user to more easily grasp the securing nut 46 to tighten it about the threaded protrusion 48.

The lid 12 additionally comprises a bearing structure 50. The bearing structure 50 supports the rotatable blade carrier 32 near the opening 30 of the lid 12. The bearing structure 50 enhances the structural stability of the lid 12, particularly near the periphery 24, near the opening 30. The bearing structure 50 generally runs from one end of the handle track 44 to another end of the handle track 44. The bearing structure 50 is adapted to resist displacement of the rotatable blade carrier 32 towards the container 14 when the rotary mandolin 10 is being utilized.

Figure 8:
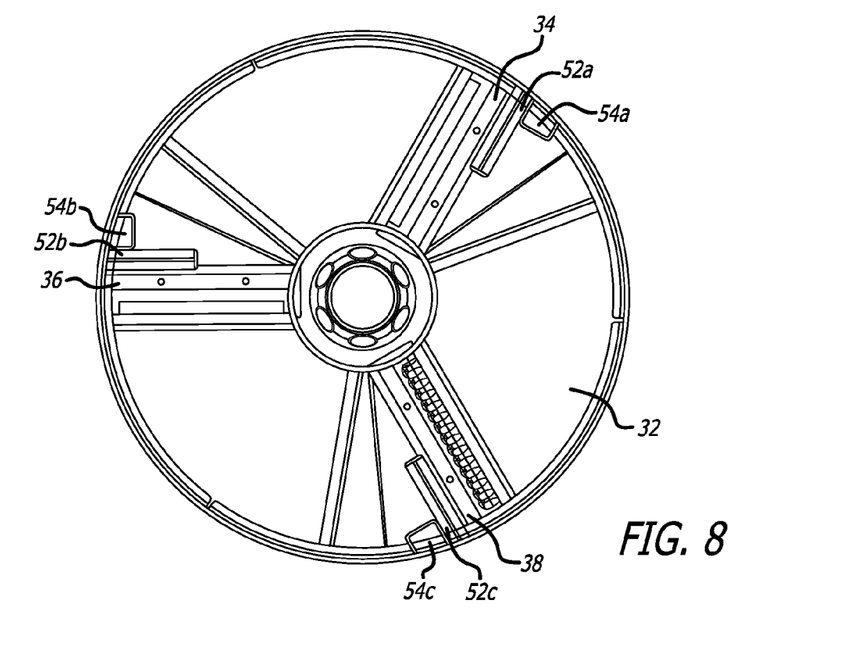
FIG. 8 is bottom view of a blade carrier of the rotary mandolin of FIG. 1.
Figure 9:
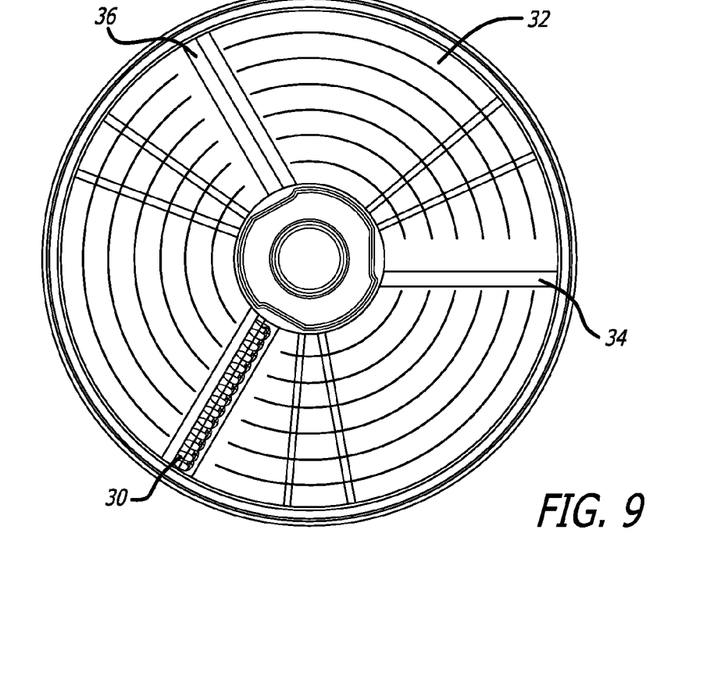
FIG. 9 is a top view of the blade carrier of FIG. 8.

FIGS. 8 and 9 show the rotatable blade carrier 32 removed from the lid 12. The rotatable blade carrier 32 has a central opening 33 adapted to be positioned around the threaded protrusion 48. As best viewed in FIG. 8, the rotatable blade carrier 32 additionally comprises an operating handle receiving portion 52a-52c and an operating handle securing portion 54a-54c disposed adjacent the respective first blade 34, second blade 36, and third blade 38. Each of the operating handle receiving portions 52a-52c is adapted to receive a handle protrusion 56 (FIGS. 11 and 12) of the operating handle 40 to allow a user to utilize the operating handle 40 to turn the rotatable blade carrier 32 within the rotary mandolin 10 when using one of the blades 34, 36, 38. The operating handle securing portion 54a-54c allows the operating handle 40 to be removably secured to the rotatable blade carrier 32 by receiving a locking portion 58 (FIGS. 11 and 12) of the operating handle 40. The operating handle securing portions 54a-54c each have a ledge 55 that is adapted to interact with a tab 60 (FIGS. 11 and 12) of the locking portion 58 of the operating handle 40.

Figure 11:
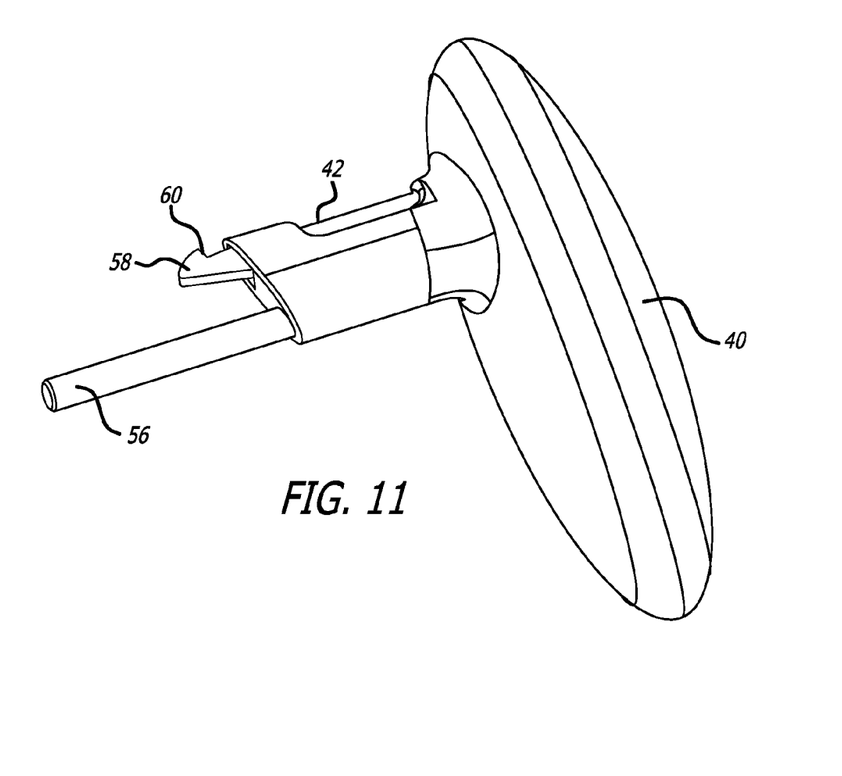
FIG. 11 is a perspective view of an operating handle of the rotary mandolin of FIG. 1.
Figure 12:
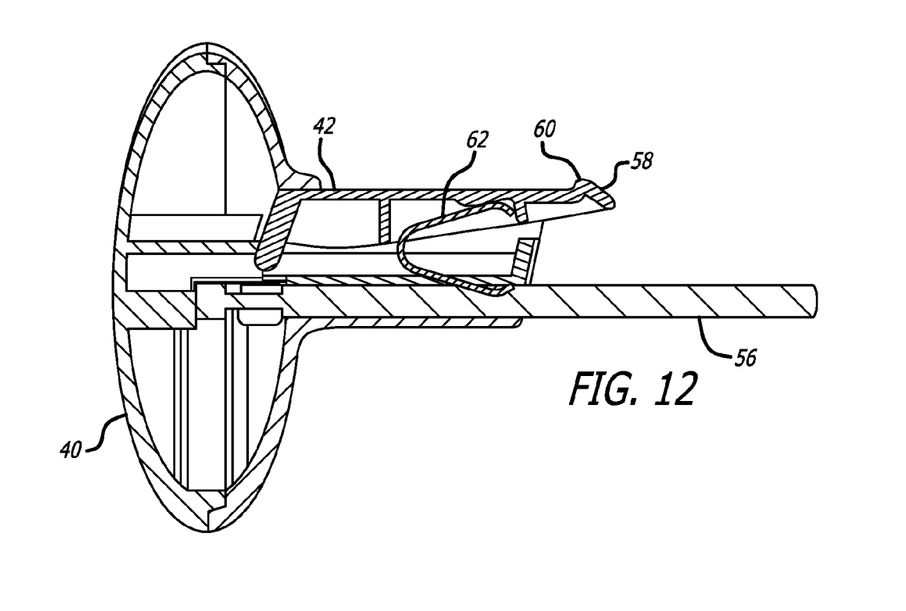
FIG. 12 is a sectional view of the operating handle of FIG. 11.

In order to remove the operating handle 40 from the rotatable blade carrier 32, the release activator 42 of the operating handle is depressed by a user. The force against the release activator compresses a spring 62 allowing the locking portion 58 to be displaced. The displacement of the locking portion 58 positions the tab 60 away form the ledge 55 of the particular operating handle securing portion 54a-54c of the rotatable blade carrier 32 so that the operating handle 40 may be removed from the rotatable blade carrier 32.

To place the operating handle 40 into a different one of the operating handle receiving portions 52a-52c and operating handle securing portions 54a-54c, a user retracts the retractable door 26 and rotates the rotatable blade carrier 32 such that the desired blade 34, 36, 38 is positioned within the opening 30. The user then positions the operating handle 40 such that the handle protrusion 56 aligns with one of the operating handle receiving portions 52a-52c and the locking portion 58 aligns with one of the operating handle securing portions 54a-54c. The user then inserts the handle protrusion 56 into one of the operating handle receiving portions 52a-52c while the locking portion 58 inserts into one of the operating handle securing portions 54a-54c such that the tab 60 interacts with the ledge 55 to secure the operating handle 40 to the rotatable blade carrier 32.

Figure 10A:
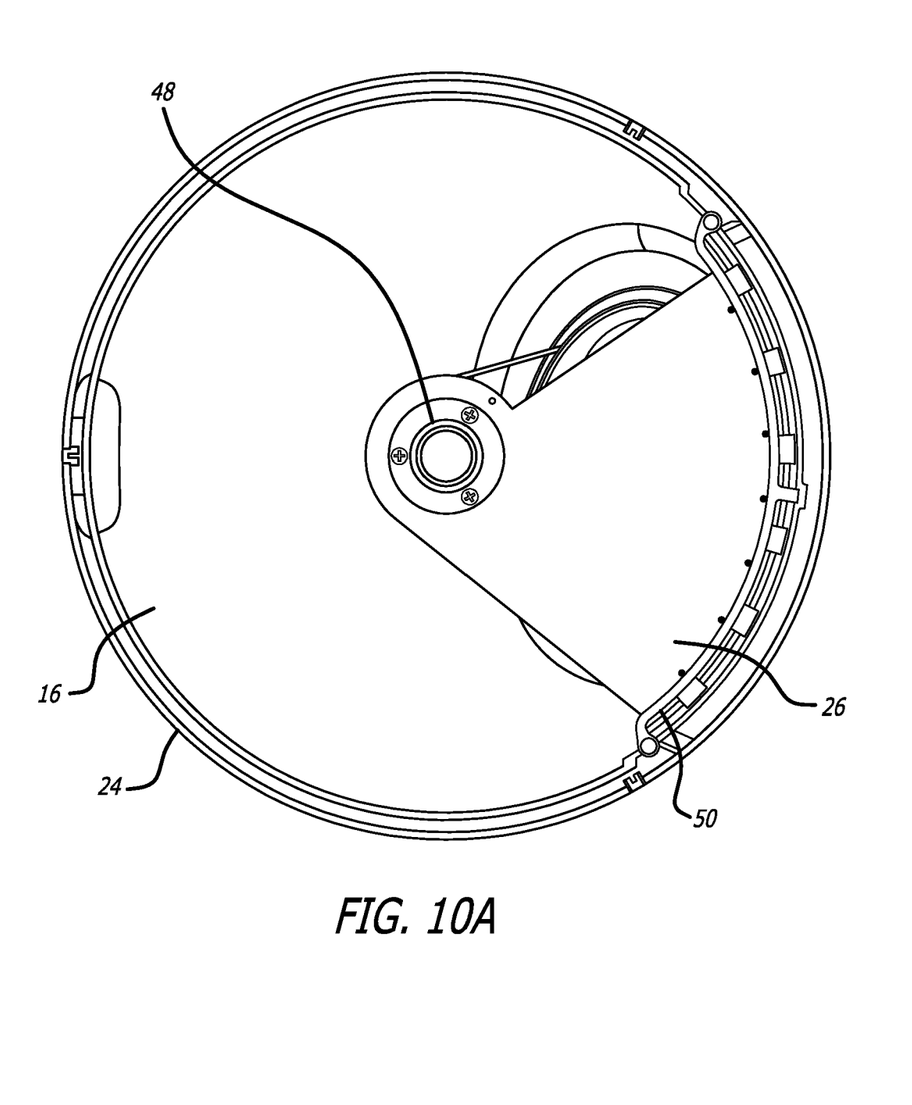
FIG. 10 is a perspective view of the lid of the rotary mandolin of FIG. 1 with the blade carrier removed.
Figure 10B:
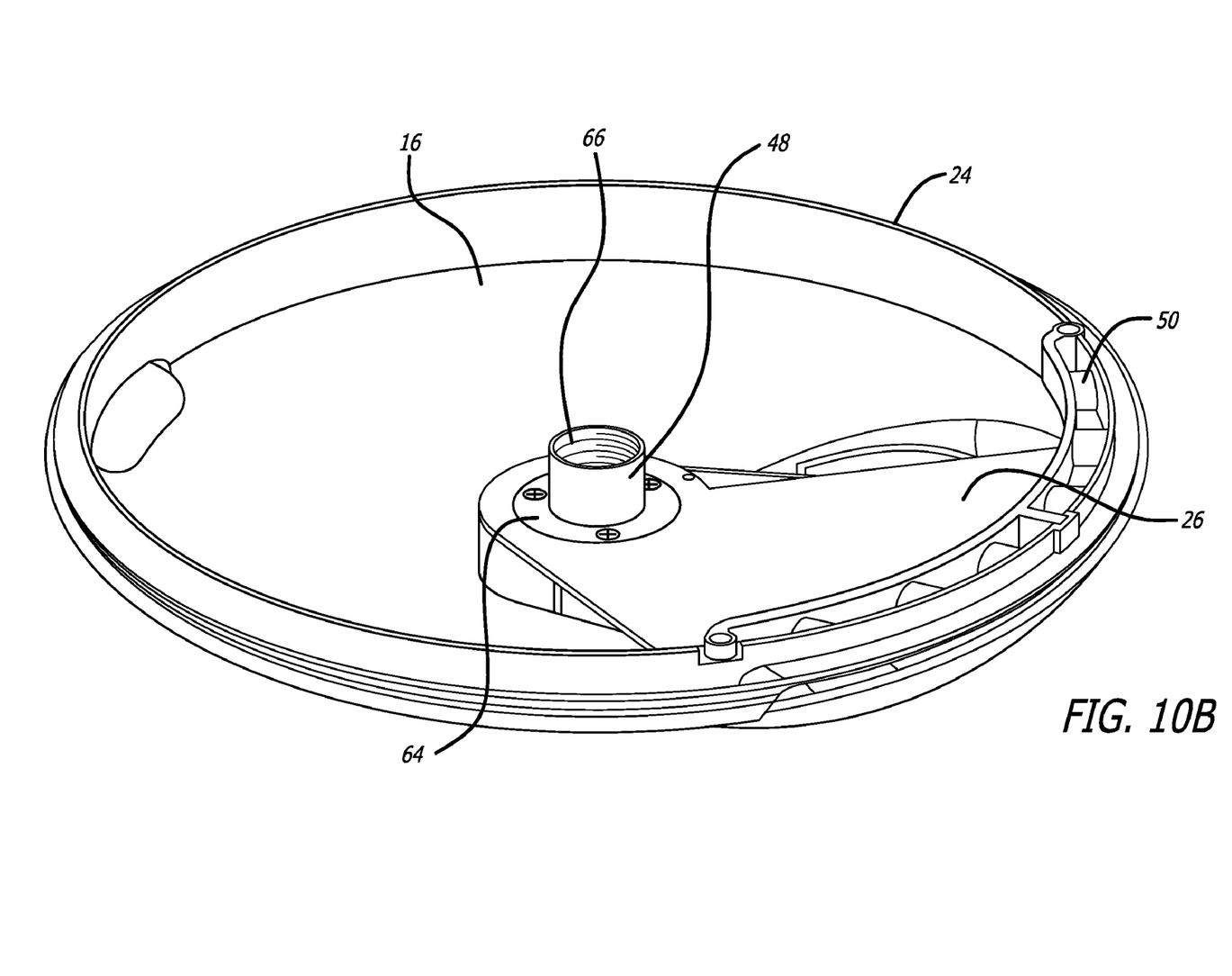

FIG. 10 depicts the lid 12 with the rotatable blade carrier 32 having been removed. The retractable door 26 has an opening 64 that is positioned around the threaded protrusion 48. It is contemplated that a biasing member, such as torsional spring, may be provided between the cover 16 and the retractable door 26, such that the retractable door 26 is closed unless a force acts on the retractable door 26 to overcome a force of the biasing member.

As shown in FIG. 10, the threaded protrusion 48 has internal threads 66. The internal threads 66 interact with the securing nut 46 to hold the retractable door 26 and the rotatable blade carrier 32 to the cover 16 to form the lid 12 of the rotary mandolin 10.

To use the rotary mandolin 10, the user selects the desired blade 34, 36, 38 and positions the operating handle 40 accordingly. The user then moves the retractable door 26 to the retracted position and places an item to be cut within the opening 30, such that the item to be cut contacts the rotatable blade carrier 32. The user then moves the operating handle 40 along the handle track 44. The blade 34, 36, 38 contacts the item to be cut and slices fall into the container 14 of the rotary mandolin. It is contemplated that the user may use the food pusher 45 to apply pressure to the item to be cut while moving the operating handle 40 to ensure that the blade 34, 36, 38 cuts the item as desired. It is also contemplated that a user may apply pressure using a hand to the item to be cut. When a sufficient quantity of the item to be cut is obtained, the user removes any remaining portion of the item to be cut from the opening 30, and the retractable door 26 returns to the deployed position, such that the blade 34, 36, 38 is covered by the retractable door 26.

While the specific embodiments have been illustrated and described, numerous modifications come to mind without significantly departing from the spirit of the invention, and the scope of protection is only limited by the scope of the accompanying Claims.

What is claimed is:

1. A rotary mandolin assembly for processing food comprising:
    a container having a base and a sidewall connecting to and protruding upwardly from the base, the sidewall terminating at a flange;
    a lid contacting the flange of the sidewall of the container, the lid comprising:
        a cover with an opening formed therein;
        a retractable door disposed above the opening of the cover and adapted to be positioned in one of a first position and a second position;
        a rotatable blade carrier having a plurality of blades, the blade carrier being disposed beneath the cover and the retractable door; and
    an operating handle removably connecting to the blade carrier.

2. The rotary mandolin assembly of claim 1, wherein the retractable door further comprises a door handle.

3. The rotary mandolin assembly of claim 1, wherein the lid additionally comprises a handle track positioned to receive a portion of the operating handle, the handle track being disposed along a periphery of the lid.

4. The rotary mandolin assembly of claim 3, wherein the lid additionally comprises a bearing structure supporting the blade carrier and being disposed beneath the handle track.

5. The rotary mandolin assembly of claim 1, wherein the lid additionally comprises a threaded protrusion extending downward from the cover towards the container.

6. The rotary mandolin assembly of claim 5, wherein blade carrier has an opening disposed about the threaded protrusion.

7. The rotary mandolin of claim 6, wherein the retractable door has an opening disposed about the threaded protrusion.

8. The rotary mandolin of claim 7, further comprising a securing nut attached to the threaded protrusion, the securing nut provided to secure the blade carrier and the retractable door to the cover of the lid.

9. The rotary mandolin assembly of claim 1, wherein the operating handle comprises a handle protrusion adapted to insert into an operating handle receiving portion of the blade carrier.

10. The rotary mandolin assembly of claim 1, wherein the operating handle comprises a handle locking portion adapted to insert into an operating handle securing portion of the blade carrier to releasably secure the operating handle to the blade carrier.

11. The rotary mandolin assembly of claim 1, wherein the first position of the retractable door is a deployed position, and the second position of the retractable door is a retracted position.

12. The rotary mandolin assembly of claim 11, wherein the lid additionally comprises a biasing member attached to the retractable door, the biasing member applying a force to position the retractable door towards the deployed position.

13. A lid for a food processing rotary mandolin assembly comprising:
    a cover having a threaded protrusion extending downward from the cover, and the cover having an opening formed therein;
    a retractable door being disposed above the opening of the cover, the retractable door having a first position and a second position, the retractable portion having an opening disposed around the threaded protrusion of the cover;
    a rotatable blade carrier being disposed below the cover, the blade carrier having a plurality of blades, the blade carrier being moveable to a processing position wherein at least one of the plurality of blades is positioned below the opening of the cover; and
    an operating handle removably attached to the blade carrier.

14. The lid of claim 13 further comprising a securing nut attached to the threaded protrusion, the retractable door and the blade carrier being disposed between the cover and the securing nut.

15. The lid of claim 13, wherein the operating handle additionally comprises:
    a handle protrusion; and
    a handle locking portion.

16. The lid of claim 15, wherein the blade carrier additionally comprises:
    an operating handle receiving portion disposed at a periphery of the blade carrier; and
    an operating handle securing portion disposed at the periphery of the blade carrier, and further being disposed adjacent the operating handle receiving portion of the blade carrier.

17. The lid of claim 16, wherein the handle locking portion is insertable into an operating handle securing portion of the blade carrier to releasably secure the operating handle to the blade carrier.

18. The lid of claim 13, wherein cover comprises a handle track positioned to receive a portion of the operating handle, the handle track disposed along a periphery of the cover.

19. The lid of claim 18 further comprising a bearing structure contacting the blade carrier and disposed beneath the handle track.

20. A rotatable blade carrier assembly for a rotary mandolin assembly comprising:
    a plurality of cutting blades positioned on the blade carrier;

a plurality of operating handle receiving portions disposed at a periphery of the blade carrier;

a plurality of operating handle securing portions disposed at the periphery of the blade carrier, and further being disposed adjacent the operating handle receiving portion of the blade carrier; and wherein one of the plurality of operating handle receiving portions and one of the plurality of operating handle securing portions is associated with one of the plurality of cutting blades.

* * * * *